(12) United States Patent
Burke (10) Patent No.: US 6,699,426 B1
(45) Date of Patent: Mar. 2, 2004

(54) GYPSUM WALLBOARD CORE, AND METHOD AND APPARATUS FOR MAKING THE SAME

(75) Inventor: William Roy Burke, Tonawanda, NY (US)

(73) Assignee: National Gypsum Properties, LLC., Charlotte, NC (US)

( * ) Notice: Subject to any disclaimer, the term of this patent is extended or adjusted under 35 U.S.C. 154(b) by 0 days.

(21) Appl. No.: 09/569,981

(22) Filed: May 10, 2000

Related U.S. Application Data (60) Provisional application No. 60/147,801, filed on Aug. 9, 1999, and provisional application No. 60/139,183, filed on Jun. 15, 1999.

(51) Int. Cl.[7] .......................... B29C 70/26; B29C 47/00
(52) U.S. Cl. .................... 264/426; 264/474; 264/177.2; 264/211; 264/211.11
(58) Field of Search .............................. 264/426, 177.2, 264/176.1, 204, 211, 177.11, 211.11, 211.12, 211.24, 70, 74, 75, 148, 474, 42; 366/3, 5; 156/43; 425/131.1, 133.5

(56) References Cited

U.S. PATENT DOCUMENTS

| | | | |
|---|---|---|---|
| 2,762,738 A | 9/1956 | Teale ........................... 154/87 |
| 2,962,786 A | * 12/1960 | Hawk ....................... 425/131.1 |
| 2,985,219 A | 5/1961 | Summerfield ................... 154/1 |
| 3,314,613 A | 4/1967 | Gall ............................. 241/19 |
| 3,405,425 A | * 10/1968 | Buckley et al. ........... 425/133.5 |
| 3,832,250 A | 8/1974 | Pearson ........................ 156/39 |
| 3,872,204 A | 3/1975 | Yano et al. ................. 264/102 |
| 3,890,419 A | * 6/1975 | Kaniecki ................. 425/131.1 |
| 3,891,453 A | 6/1975 | Williams ...................... 106/85 |
| 3,923,438 A | * 12/1975 | Perla ........................ 425/131.1 |
| 4,042,409 A | * 8/1977 | Terada et al. ............... 106/660 |
| 4,201,595 A | 5/1980 | O'Neill ....................... 106/109 |
| 4,279,673 A | 7/1981 | White et al. ................... 156/39 |
| 4,330,589 A | * 5/1982 | Saito et al. .................... 264/42 |
| 4,544,424 A | 10/1985 | Take et al. ..................... 156/39 |
| 4,942,003 A | 7/1990 | Bold .......................... 264/40.4 |
| 5,000,900 A | 3/1991 | Baumgartner .......... 264/211.23 |
| 5,100,474 A | 3/1992 | Hawkins ..................... 106/711 |
| 5,220,762 A | * 6/1993 | Lehnert et al. ............. 264/133 |
| 5,256,222 A | 10/1993 | Shepherd et al. ............. 156/41 |

(List continued on next page.)

FOREIGN PATENT DOCUMENTS

| EP | 0774445 A1 | * 5/1997 |
|---|---|---|
| GB | 2336360 A | 10/1999 |
| GB | 2336585 A | 10/1999 |
| WO | WO 98/30515 | 7/1998 |
| WO | WO 00/76937 A1 | * 12/2000 |

OTHER PUBLICATIONS

International Search Report in PCT/US00/13145 dated Sep. 13, 2000.

(List continued on next page.)

*Primary Examiner*—Mark Eashoo
(74) *Attorney, Agent, or Firm*—Howrey Simon Arnold & White, LLP; Anthony Nimmo, Esq.

(57) ABSTRACT

A gypsum wallboard core, and methods and apparatus for making the same are disclosed. Methods of making a gypsum wallboard core include extruding a gypsum slurry containing water, gypsum, slip agents, water-reducing agents, surfactants and, optional additives, through a die and onto a substantially flat, smooth, moving surface. The die has provisions at its outer sides for the introduction of slip agents into the slurry, and provisions at its lateral outer edges for the introduction of a strength-enhancing agent. Once extruded onto the conveyor belt, the slurry is chemically-activated to set and form a hardened board core which then may be easily removed from the conveyor belt and dried.

38 Claims, 2 Drawing Sheets

U.S. PATENT DOCUMENTS

| | | | | |
|---|---|---|---|---|
| 5,304,355 A | | 4/1994 | Yant et al. | 422/225 |
| 5,320,677 A | | 6/1994 | Baig | 106/780 |
| 5,342,566 A | * | 8/1994 | Schafer et al. | 264/102 |
| 5,482,551 A | | 1/1996 | Morris et al. | 106/772 |
| 5,545,297 A | * | 8/1996 | Andersen et al. | 264/211.11 |
| 5,607,233 A | | 3/1997 | Yant et al. | 366/102 |
| 5,683,635 A | | 11/1997 | Sucech et al. | 264/42 |
| 5,798,151 A | * | 8/1998 | Andersen et al. | 428/703 |
| 5,879,486 A | * | 3/1999 | Philips et al. | 156/39 |
| 5,879,825 A | | 3/1999 | Burke et al. | 428/703 |
| 6,101,793 A | * | 8/2000 | Nagai et al. | 55/523 |

OTHER PUBLICATIONS

Written Opinion in PCT/US00/13145 dated May 4, 2001.

Petersen, D.J., et al. "Calcium Compounds (Calcium Sulfate)," *Encyclopedia of Chemical Technology*, (1992 4th ed.), vol. 4, pp. 812–826, TP9.E685.

Michelsen, T. "Building Materials (Survey)," *Encyclopedia of Chemical Technology*, (1992 4th ed.), vol. 4, pp. 605–624, TP9.E685.

Product Brochure for "The Readco Continuous Processor," 5 pages (Undated).

* cited by examiner

GYPSUM WALLBOARD CORE, AND METHOD AND APPARATUS FOR MAKING THE SAME

CROSS-REFERENCE TO RELATED APPLICATIONS

Priority benefit under 35 U.S.C. §119(e) of U.S. provisional patent application Ser. No. 60/147,801 filed Aug. 9, 1999, and U.S. provisional patent application Ser. No. 60/139,183 filed Jun. 15, 1999, is claimed.

BACKGROUND OF THE INVENTION

1. Field of the Invention

The present invention generally relates to the production of gypsum board materials and, more specifically, the invention relates to the manufacture of gypsum wallboard utilizing an extrusion technique to prepare a gypsum core.

2. Brief Description of Related Technology

A common method of constructing walls and ceilings includes the use of inorganic wallboard panels or sheets, such as gypsum wallboard, often referred to simply as "wallboard" or "drywall." Wallboard can be formulated for interior, exterior, and wet applications. The use of wallboard, as opposed to conventional boards made from wet plaster methods, is desirable because the installation of wallboard is ordinarily less costly and less cumbersome when compared to the installation of conventional plaster walls.

Walls and ceilings made with gypsum wallboard panels typically are constructed by securing, e.g., with nails or screws, the wallboard panels to structural members, such as vertically- and horizontally-oriented pieces of steel or wood often referred to as "studs." Because wallboard typically is supplied in standard-sized sheets or panels, when forming a wall from the sheets, there will generally be a number of joints between adjacent sheets. In most wallboard construction, these joints typically are filled and coated with an adhesive material called a joint compound so that the wall will have a smooth finish similar to that obtained with conventional plaster walls.

Generally, wallboard is produced by enclosing a core of an aqueous slurry of calcined gypsum and other materials between two large sheets of board cover paper. Various types of cover paper are known in the art. After the gypsum slurry has set (i.e., reacted with water present in the aqueous slurry) and dried, the formed sheet is cut into standard sizes. Methods for the production of gypsum wallboard generally are described, for example, by Michelsen, T. "Building Materials (Survey)," *Encyclopedia of Chemical Technology,* (1992 4th ed.), vol. 21, pp. 621–24, TP9.E685, the disclosure of which is hereby incorporated herein by reference.

Gypsum wallboard is manufactured utilizing commercial processes that are capable of operation under continuous, high-speed conditions. A conventional process for manufacturing the core composition of gypsum wallboard initially includes the premixing of dry ingredients in a high-speed mixing apparatus. The dry ingredients can include calcium sulfate hemihydrate (stucco), an accelerator, and an antidesiccant (e.g., starch). The dry ingredients are mixed together with a "wet" (aqueous) portion of the core composition in a pin mixer apparatus. The wet portion can include a first component, commonly referred to as a "paper pulp solution," that includes a mixture of water, paper pulp, and, optionally, one or more fluidity-increasing agents, and a set retarder. The paper pulp solution provides a major portion of the water that forms the gypsum slurry of the core composition. A second wet component can include a mixture of the aforementioned strengthening agent, foam, and other conventional additives, if desired. Together, the aforementioned dry and wet portions comprise an aqueous gypsum slurry that eventually forms a gypsum wallboard core.

A major ingredient of the gypsum wallboard core is calcium sulfate hemihydrate, commonly referred to as "calcined gypsum," "stucco," or "plaster of Paris." Stucco has a number of desirable physical properties including, but not limited to, its fire resistance, thermal and hydrometric dimensional stability, compressive strength, and neutral pH. Typically, stucco is prepared by drying, grinding, and calcining natural gypsum rock (i.e., calcium sulfate dihydrate). The drying step in the manufacture of stucco includes passing crude gypsum rock through a rotary kiln to remove any free moisture present in the rock from rain or snow, for example. The dried rock then is passed through a roller mill (or impact mill types of pulverizers), wherein the rock is ground or comminuted to a desired fineness. The degree of comminution is determined by the ultimate use. The dried, fine-ground gypsum can be referred to as "land plaster" regardless of its intended use. The land plaster is used as feed to calcination processes for conversion to stucco.

The calcination (or dehydration) step in the manufacture of stucco is performed by heating the land plaster, and generally can be described by the following chemical equation which shows that heating calcium sulfate dihydrate yields calcium sulfate hemihydrate (stucco) and water vapor:

$$CaSO_4 \cdot 2H_2O + \text{heat} \rightarrow CaSO_4 \cdot \tfrac{1}{2}H_2O + 1\tfrac{1}{2}H_2O.$$

This calcination process step is performed in a "calciner," of which there are several types known by those of skill in the art.

Uncalcined calcium sulfate (i.e., land plaster) is the "stable" form of gypsum. However, calcined gypsum, or stucco, has the desirable property of being chemically reactive with water, and will "set" rather quickly when the two are mixed together. This setting reaction is actually a reversal of the above-described chemical reaction performed during the calcination step. The setting reaction proceeds according to the following chemical equation which shows that the calcium sulfate hemihydrate is rehydrated to its dihydrate state:

$$CaSO_4 \cdot \tfrac{1}{2}H_2O + 1\tfrac{1}{2}H_2O \rightarrow CaSO_4 \cdot 2H_2O + \text{heat}.$$

The actual time required to complete the setting reaction generally depends upon the type of calciner and the type of gypsum rock that are used to produce the gypsum, and can be controlled within certain limits by the use of additives such as retarders, set accelerators, and/or stabilizers, for example. Generally, the rehydration time period can be in a range of about two minutes to about eight hours depending on the quantity of retarders, set accelerators, and/or stabilizers present.

After the aqueous gypsum slurry is prepared, the slurry and other desired ingredients are continuously deposited to form a gypsum wallboard core (hereinafter "wallboard core" or "core") slurry between two continuously-supplied moving sheets of cover paper. The two cover sheets comprise a pre-folded face paper and a backing paper. As the slurry is deposited onto the face paper, the backing paper is brought down atop the deposited core slurry and bonded to the prefolded edges of the face paper. The whole assembly then is sized for thickness utilizing a roller bar or forming plate. The deposited core slurry is then allowed to set between the two cover sheets, thereby forming a board. The continuously-produced board is cut into panels of a desired length, which are vertically-stacked, and then passed through a drying kiln where excess water is removed from the board to form a strong, dry, and rigid building material.

The cover sheets used in the process typically are multi-ply paper manufactured from re-pulped newspapers. The face paper has an unsized inner ply which contacts the core slurry such that gypsum crystals can grow up to (or into) the inner ply—this, along with the starch present in the slurry, is the principal form of bonding between the core slurry and the cover sheet. The middle plies are sized and an outer ply is more heavily sized and treated to control absorption of paints and sealers. The backing paper is also a similarly constructed multi-ply sheet. Both cover sheets must have sufficient permeability to allow for water vapor to pass therethrough during the downstream board drying step(s).

Standardized sheets (or panels) of wallboard typically are about four feet (about 1.22 meters) wide and about 8 feet to about 16 feet (about 2.4 meters to about 4.9 meters) in length. Sheets typically are available in thicknesses varying in a range of about ¼ inch to about one inch (about 0.6 centimeters to about 2.6 centimeters).

In order to provide satisfactory strength, commercially-available gypsum wallboard generally requires a density of about 1600 to about 1700 pounds (about 726 to about 772 kilograms) per thousand square feet (lbs/MSF) of one-half inch board. Heavy or high-density gypsum wallboards are more costly and difficult to manufacture, transport, store, and manually install at job sites, compared to lighter or low-density boards. It is possible to formulate wallboard having reduced densities through the inclusion of light-weight fillers and foams, for example. Often, however, where wallboard is formulated to have a density less than about 1600 lbs/MSF of one-half inch board, the resulting strength is unacceptable for commercial sale. Because high-density or heavy gypsum wallboard generally is not desirable, various attempts have been made to reduce board weight and density without sacrificing board strength. However, while lighter and less dense wallboard products can be produced, many of the wallboard products may be of a quality ill-suited for commercial use.

Morris et al. U.S. Pat. No. 5,482,551 discloses an extrudable composition for use in production of articles for building and construction made of about 45–85 weight percent calcium sulfate dihydrate and a filler to control density.

In view of the foregoing, it would be desirable to produce high-strength gypsum wallboard having weights and densities generally equal to or slightly less than that produced by conventional methods. Reduced weight and density boards, however, should meet industry standards and have strengths similar to, or greater than, conventional wallboard. Such wallboard also should be able to be manufactured using high-speed manufacturing apparatus and not suffer from other negative side-effects. For example, such high-strength wallboard should be able to set and dry within a reasonable period of time.

Further, the use of conventional ingredients in the preparation of the aqueous slurry can cause fouling and undesired plugging of mixers and tubing used to prepare and convey, respectively, the aqueous slurry onto the paper cover sheet (s). For example, admixing set accelerators into the slurry in an upstream mixer, such as a pin mixer, can cause the slurry to begin setting (i.e., calcine or harden) before its deployment onto the cover sheet(s). Thus, it would be desirable to produce gypsum wallboard utilizing processes that do not require certain ingredients in the gypsum slurry which could cause fouling or premature setting of the slurry, or impart other undesired effects.

SUMMARY OF THE INVENTION

One aspect of the invention is a method of forming a gypsum wallboard core, which includes the method steps of preparing a gypsum slurry in a mixer, and introducing the slurry to an extrusion die, the die preferably having provisions at its periphery for the introduction of at least one gypsum slurry additive selected from the group consisting of slip agents and strength-enhancing agents. The method also preferably includes the steps of introducing the slurry additive into the slurry as the slurry exits the die, and extruding the additive-containing gypsum onto a substantially flat, moving surface. Thereafter, the slurry can be dried in a hybrid dryer by convection heating and microwave drying techniques. Therefore, another aspect of the invention is a gypsum wallboard core prepared according to the foregoing method.

Still further, another aspect of the invention is an apparatus for preparing a gypsum wallboard core. Generally, the apparatus includes a mixer that is in fluid communication with a die inlet of a die. The die comprises the die inlet and a die exit and a manifold disposed between the inlet and outlet. The apparatus also includes a substantially flat, movable surface disposed adjacent the die exit and a dryer.

Advantages of the invention may become apparent to those skilled in the art from a review of the following detailed description, taken in conjunction with the drawings, the examples, and the appended claims.

BRIEF DESCRIPTION OF THE DRAWINGS

For a complete understanding of the invention, reference should be made to the following detailed description, examples, and accompanying drawings wherein.

While the invention is susceptible of embodiment in various forms, there are illustrated in the drawing figures and will hereafter be described specific embodiments of the invention, with the understanding that the disclosure is intended to be illustrative, and is not intended to limit the invention to the specific embodiments described and illustrated herein.

DETAILED DESCRIPTION OF THE PREFERRED EMBODIMENTS

Generally, the invention is directed to a method of forming a gypsum wallboard core, which includes the method steps of preparing a gypsum slurry in a mixer and introducing the slurry, preferably under positive displacement into an extrusion die, the die preferably having provisions at its periphery for the introduction of at least one gypsum slurry additive selected from the group consisting of slip agents and strength-enhancing agents. The method also preferably includes the steps of introducing the slurry additive into the slurry as the slurry exits the die, and soft-extruding the additive-containing gypsum slurry onto a substantially flat, moving surface. Thereafter, the slurry can be dried to in a hybrid dryer by convection heating and microwave drying techniques.

Figure 1:
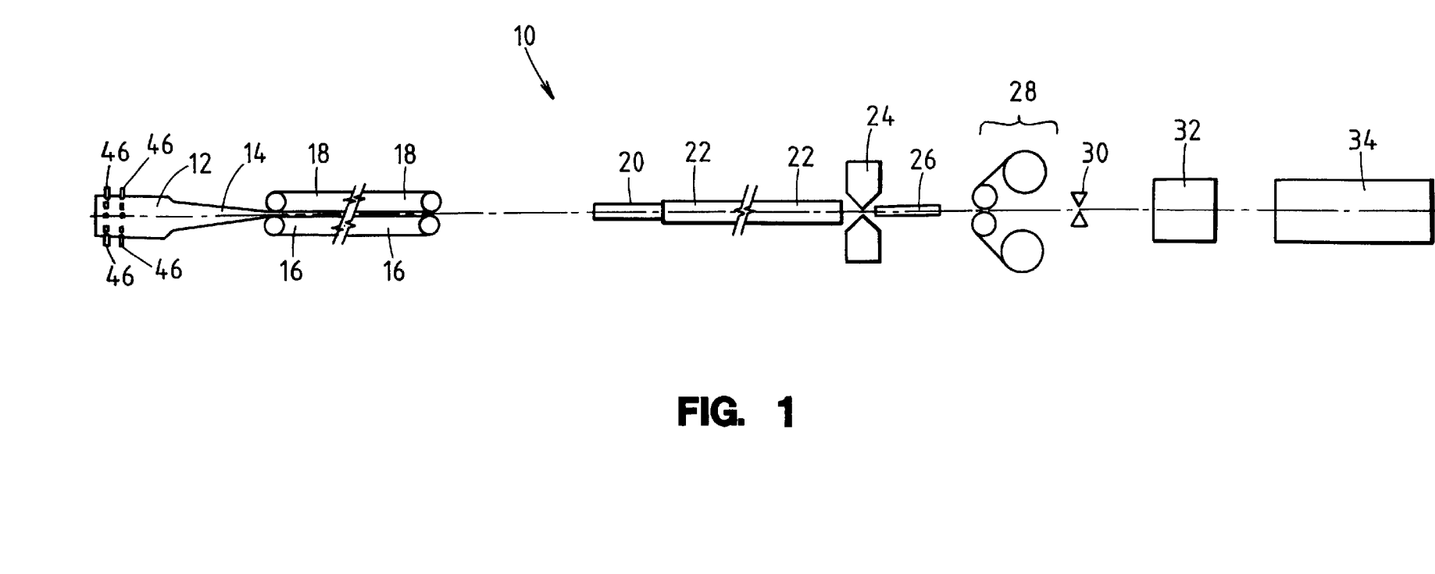
FIG. 1 is a schematic diagram illustrating various process equipment that may be useful in carrying out a method of making gypsum wallboard according to the invention; and, FIG. 2 is a schematic diagram illustrating in more detail features of the equipment and method illustrated in FIG. 1.

For a general overview of the invention, reference should be made to the drawing figures wherein like reference numbers designate the same or similar structure throughout the various figures. FIG. 1 illustrates an embodiment of a process 10 of the present invention. The process 10 includes a mixer 12 which mixes dry and wet ingredients making up a gypsum slurry (not shown) and discharges the formed slurry through a die 14, described in greater detail below. The slurry exits the die 14 and is extruded directly onto a smooth surface of a conveyor belt 16. A top conveyor belt 18, optionally, also can be used. Downstream of the conveyor belt 16 is a hybrid dryer 20 that includes microwave heating and convection drying sections (not shown). Downstream of the hybrid dryer 20 is a convection dryer 22 wherein any excess water present in the extruded slurry is removed via convection drying to result in a dry wallboard core. Both of the hybrid dryer 20 and convection dryer 22 are described in greater detail below.

With continued reference to FIG. 1, downstream of the hybrid dryer 20 and convection dryer 22, the dried wallboard core can undergo optional core enhancing treatments in a suitable apparatus 24 known to those skilled in the art. To the extent such optional core enhancing treatments include the application of water to the wallboard core, an optional surface treatment dryer 26, typically a small convection dryer, can be used to remove the water. The wallboard core, optionally, can be surface treated to include various coverings (i.e., paper cover sheets), decorative coverings, and/or lamination in a suitable surface treatment apparatus 28 before being trimmed and cut with trimming equipment 30. After the wallboard has been cut and shaped, the wallboard can be stacked and bundled utilizing stacking equipment 32 known to those of skill in the art and stored in a warehouse 34, or using other suitable storage means.

Figure 2:
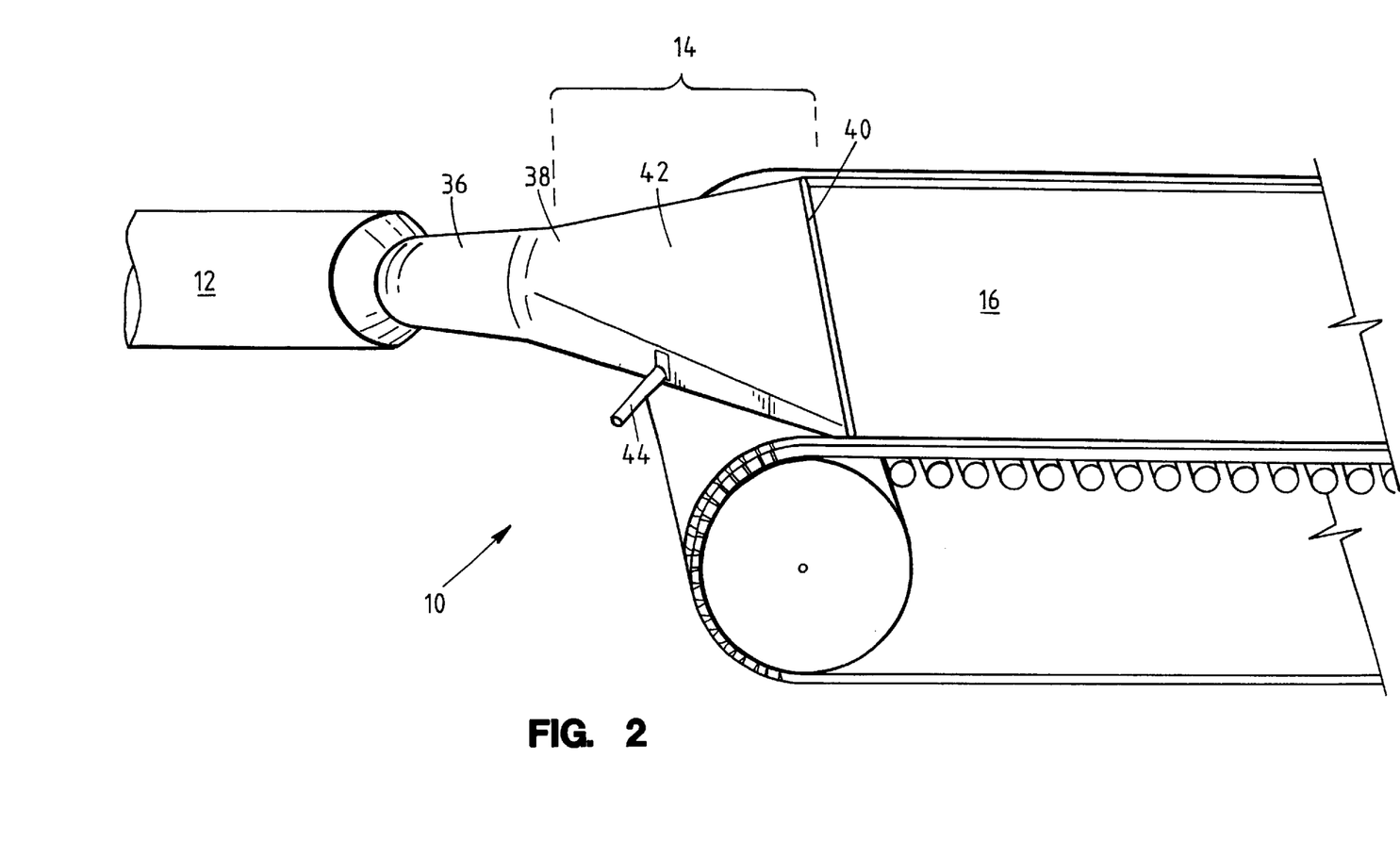

FIG. 2 illustrates a more detailed view of the process 10. Specifically, the mixer 12 is shown in FIG. 2 connected at a mixer discharge end 36 to the die 14. The die 14 includes a die inlet 38, a die exit 40, and a die manifold 42 disposed between the inlet 38 and exit 40. The die 14 preferably includes a plurality of conduits, such as for example, one or more conduits 44, for introducing various additives into the discharging slurry. The slurry is discharged directly onto the conveyor belt 16 which carries the deposited slurry to downstream processing equipment (described and shown in FIG. 1) where preparation of the wallboard product can be completed.

A preferred embodiment of the invention includes the preparation of gypsum slurry in a mixer (described in more detail below), other than a pin mixer. The slurry includes gypsum, water, slip agents, water-reducing agents, surfactants and, optionally, binders, set retarders (setting agents), paper pulp, glass fibers, fly ash spheres, mica, paraffin granules, perlite, and/or vermiculite. Preferably, a pregenerated foam also is introduced into the mixer in a manner such that the foam is homogeneously distributed throughout the slurry; the foam is not injected into the slurry as the slurry exits the mixer or die because foam injection does not necessarily ensure homogenous distribution.

A suitable mixer for use in accordance with the invention should be capable of delivering a viscous gypsum slurry to a die under positive displacement. The term "positive displacement" is intended to mean that a gypsum slurry, or ingredients comprising a gypsum slurry, are passed through a mixer having no (or no excess) void spaces therein. The phrases "void spaces" and "excess void spaces" are intended to mean spaces existing within a mixer during mixer operation that are not filled with a gypsum slurry or ingredients comprising a gypsum slurry. Void spaces (or excess void spaces) within the mixer provide areas for portions of the slurry to undesirably collect or "hang up." The collected slurry sits in these void spaces and eventually hydrates (hardens). In time, the hardened gypsum is likely to become dislodged from the void spaces and undesirably flow in a mixture of the slurry out of the mixer. Alternatively, the dislodged and hardened gypsum can damage and/or plug the mixer and, thereby, force the operator to shut down the mixer for a period of time sufficient to fix the damaged mixer components and/or to remove the hardened gypsum material. A mixer operating to provide a gypsum slurry under positive displacement, by the foregoing definition, has a minimal amount or no void spaces therein.

By way of example, a suitable mixer for use in the invention includes a twin screw continuous mixer modified to ensure a positive displacement. A twin screw mixer (hereinafter a "TSC mixer") can be obtained from Readco Mfg. Co. of York, Pa., and is described in a product bulletin for Readco's Continuous Processor (entitled the "Readco Continuous Processor," undated) and in U.S. Pat. No. 5,000,900, the disclosures of which are hereby incorporated herein by reference. While it is not recommended that such a TSC mixer be used in the present invention without modifications (described below), the general design of the TSC mixer is informative nonetheless.

A TSC mixer generally includes adjacent, co-rotating shafts (screws) axially disposed within a single barrel or housing. The screws rotate in opposite directions with respect to each other. Each shaft includes paddles (or screw threads) which extend from a screw shaft to almost contact or touch the inside surface of the barrel and to almost contact or touch the other shaft and its associated paddles (i.e., there should be no contact). During operation, the screws and associated paddles convey or push the materials (ingredients and/or slurry) from one end of the mixer to the other end of the mixer, which is preferably connected to a die. Furthermore, during operation, the close proximity between the paddles of one shaft and its neighboring shaft, and between the paddles and the inside barrel surface serve, to provide the TSC mixer with a self-wiping action which reduces the likelihood of fouling or plugging of the mixer.

Generally, a TSC mixer is divided into multiple sections which can be used to perform various functions including, but not limited to, pre-mixing dry ingredients, conveying dry ingredients, pre-mixing wet ingredients, mixing dry and wet ingredients to form a mixed slurry, and conveying the slurry. In other words, sections of the TSC mixer are desirably designed to perform different functions as the mixed slurry is formed and passes through each section.

The TSC mixer is described hereafter with respect to imaginary sections or locations along the screw shaft where raw materials are introduced. The sections generally are not separated by structure, and instead are defined by the locations at which the operator determines that various components will be added. For example, a first section of the TSC mixer preferably serves to introduce and convey various dry ingredients, such as stucco and, optionally, vermiculite and fiberglass, for example, which comprise a dry mixed blend. A second section downstream of this first section preferably serves to convey mix the dry mixed blend. A third section downstream of the first and second sections preferably is designed to introduce pulp water (preferably containing potash and pregenerated foam) into the dry mixed blend. Here, the mixing/blending action of the TSC mixer is relatively high shear ensuring thorough blending of all of the ingredients (wet and dry) in a short time and over a screw shaft length. Additionally, a suitable set accelerator, such as a ball mill accelerator, can be added into the mixer and combined with the mixed material to form the slurry. The slurry preferably is expelled from this mixing/blending section and discharged into a die (described herein in greater detail). Accordingly, the mixing/blending section of the TSC mixer also is designed to convey the slurry into the die.

A commercially-available TSC mixer preferably is modified in order to ensure positive displacement of the gypsum slurry. One such modification includes ensuring that the cross-sectional area for flow throughout the mixer remains constant. As previously noted, positive displacement is believed to be ensured where the mixer contains a small amount or no void spaces. With a constant flow of raw materials into the mixer and a correspondingly consistent rotation of the screws, it is not likely that the slurry will undesirably collect and harden within a mixer having a constant cross-sectional area.

Another preferred modification to the commercially-available TSC mixer includes provisions (e.g., conduits or injection ports) throughout the mixer for the introduction of the various dry and wet ingredients that comprise the gypsum slurry. As previously noted, the dry and wet ingredients are preferably introduced into the mixer in a sequential manner. In order to introduce these ingredients in sequence and to ensure a proper mixing of all slurry ingredients, the TSC mixer should be designed or modified to include a plurality of conduits or injection ports for introduction of these ingredients. More preferably, the mixer should be modified to include multi-injection ports 46 (see FIG. 1) to ensure that water is properly mixed with the dry ingredients. The water introduced into these ports 46 can be in the form of foam water and/or pulp water.

Other suitable mixers for use in the present invention include modified versions of the mixers disclosed in U.S. Pat. Nos. 5,304,355 and 5,607,233, which are assigned to Quantum Technologies, Inc., of Twinsburg, Ohio, and are hereby incorporated herein by reference. The mixers described in the '355 and '233 patents generally are single-screw mixers which provide a mixing of liquids, solids, and/or gases, and a self-wiping action akin to that characteristic of the TSC mixer described above. It is believed that the mixers disclosed in the '355 and '233 patents, when designed to include the modifications mentioned above with respect to the TSC mixer, will provide a viscous gypsum slurry to a die inlet under positive displacement.

Use of an appropriately modified mixer in the present invention is particularly attractive because the screw of the single screw extruder (and the co-rotating screws of the TSC mixer) and close clearances between mixer paddles on the screw shaft(s), as well as between the paddles and the barrel provide efficient, uniform mixing to result in a viscous gypsum slurry. For example, throughput in the TSC mixer preferably is engineered such that an average residence time of the material in the mixer preferably is less than about 20 seconds, more preferably less than about 15 seconds, and even more preferably less than about 10 seconds. Residence time, for purposes of the present invention, can be defined as the time period beginning when water first contacts "dry" stucco and ending when that water/stucco (i.e., gypsum slurry) mix exits the TSC mixer and is discharged into the die inlet or die manifold. The more efficient mixing and short residence times prevent material buildup (fouling or plugging) inside the barrel and result in a self-wiping action that may reduce clean-up time by as much as 90%.

The gypsum slurry is soft-extruded through a die onto a substantially flat, smooth, moving surface, such as a Teflon® material-covered conveyor belt. A preferred die 14 is shown in FIG. 2 and includes a die inlet 38 connected to a discharge end of the mixer 12, a die manifold 42, and a die exit 40. Inside the die manifold 42, the slurry occupies and takes on the shape of the manifold 42 and, therefore, obtains its final cross-sectional shape before exiting the die 14 through the die exit 40. Desirably, the die 14 and, more specifically, the die manifold 42 reshape the slurry exiting the mixer 12 from a rounded cross-sectional area to the thickness and width of the finished product.

A gypsum slurry exiting the mixer at the mixer discharge end 36 will encounter various die passages as it passes through the die 14. The incremental cross-sectional area, perpendicular to the direction of slurry flow, of the various die passages (i.e., die inlet 38, die exit 40, and die manifold 42) preferably are constant (or are constantly increasing or decreasing) to prevent gypsum slurry from undesirably collecting and hardening within the die. Furthermore, the die inlet 38 preferably has a cross-sectional area that is substantially the same as that of the mixer discharge end 36.

The die specified for use in accordance with a preferred embodiment of the invention deposits a gypsum slurry in a manner such that the slurry exiting the die has cross-sectional dimensions substantially identical to that of the hardened wallboard core. This is accomplished by utilizing a die having a die exit (or opening), through which the slurry discharges onto the moving conveyor belt, having cross-sectional dimensions substantially identical to that of the hardened wallboard core. For example, a hardened wallboard core (and the die exit both) can be about ¼ to about one inch thick (high) (about 0.64 to about 2.54 centimeters (cm)), which includes specific board core thicknesses of about 5/16, 3/8, ½, 5/8, and about ¾ inches (about 0.79, 0.95, 1.27, 1.59, and about 1.90 cm, respectively). Additionally, a hardened wallboard core (and the die exit both) can be about 4 to about 4.5 feet (about 1.22 to about 1.38 meters) wide. Thus, the die may have a width to height ratio of about 48:1 to about 216:1. In contrast, discharge boots used in conventional gypsum wallboard manufacturing processes do not possess cross-sectional dimensions in this range.

The die preferably is designed to include a die exit having a substantially rectangular geometry defined by top and bottom forming plates and side plates. These plates can be arranged to provide die exit dimensions described in the foregoing paragraph. Preferably the bottom and side plates are fixed (i.e., immovable) and the top plate is adjustable to provide the operator with flexibility in preparing gypsum wallboards of a variety of thicknesses. Depending upon the downstream drying capacity (discussed in greater detail below), the thickness of the desired wallboard and, consequently the thickness of the die exit opening, will aid in determining the speed at which wallboard can be produced (i.e., line speed). Generally, as the cross sectional area of the board decreases the line speed will increase, and vice versa. The throughput (i.e., the residence time of the slurry ingredients) in the upstream mixer can be adjusted to accommodate varying line speeds, wallboard cross-sectional areas, and downstream drying capacity.

The die preferably has one or more (preferably a plurality of) provisions or conduits for the introduction (via injection means, for example) of set accelerators and additional slip agents into the slurry, and provisions or conduits at its lateral outer edges for the introduction of a strength-enhancing acrylic polymer (described below) capable of providing reinforcement to edge portions of the formed board product. Suitable dies for use in accordance with the invention can be obtained from a number of die manufacturers and, thereafter, modified to include the provisions or conduits. For example, a suitable die with modifications can be obtained from the Phoenix Engineering Group of National Gypsum Company, of Phoenix, Ariz. Because the gypsum slurry mixer, described above, typically discharges the slurry product in a downward fashion, a transition conduit preferably connects the mixer discharge to the die inlet or manifold.

Use of the phrases "soft-extrusion" and "soft-extruded," are intended to mean that the gypsum slurry exits a suitable die without the assistance or the application of high pressure, which typically is required to extrude highly viscous materials, such as thermoplastic and thermoset resins used in other fields. While the invention is not bound by any particular mechanism or theory, it is believed that ingredients (both wet and dry) entering the mixer help force the slurry through the mixer, into the manifold, and through the die exit. The ingredients introduced into the mixer along with the positive displacement of slurry by the mixer, exert a force on the slurry passing through the die, such that the slurry exits the die under a pressure of about 5 to about 100 pounds per square inch (psi) (about 35 to about 690 kilopascals (kPa)), and preferably about 5 to about 30 psi (about 35 to about 207 kPa), more preferably about 10 to about 20 psi (about 69 to about 137 kPa).

Generally, the physical appearance and consistency of the soft-extruded slurry resembles that of a soft ice cream, as opposed to that of a cake or pancake batter. Thus, the deposited gypsum slurry desirably has a viscosity in a range of about 19,000 millipascal·seconds (mPa·s) to about 22,000 mPa·s. Preferably, however, the deposited gypsum slurry has a viscosity in a range of about 19,500 mPa·s to about 21,500 mPa·s. More preferably, the deposited gypsum slurry has a viscosity in a range of about 19,500 mPa·s to about 21,000 mPa·s. The foregoing viscosity measurements can be obtained using a Brookfield DV-III Programmable Rheometer with a No. 6 spindle operating at about 20 rotations per minute (RPM).

Once extruded onto the conveyor belt, the slurry is chemically-activated to set and form a hardened board core which may be easily removed from the conveyor belt, dried via a combination of microwave heating and convection drying means, laminated, and cut to a desired shape and size, as described in detail below.

In accordance with the invention, the gypsum slurry desirably has an open time (i.e., a working time) of less than about 30 seconds, preferably less than about 20 seconds, and more preferably less than about 10 seconds. The term "open time" as used herein refers to the time that elapses between (a) the exposure to the atmosphere of the gypsum slurry, and (b) the point where the calcined gypsum has reacted sufficiently with the water present in the slurry to form the dihydrate. The open time of a gypsum slurry can be measured by conventional procedures known by those of skill in the art.

The preferred ingredients of the wallboard core composition will now be described in more detail. Generally, a preferred method for manufacturing the core composition and wallboard of the invention initially includes the premixing of dry ingredients in a mixing apparatus (e.g., the modified TSC mixer). The dry ingredients can include calcium sulfate hemihydrate (stucco), an accelerator and, optionally, an antidesiccant (e.g., starch), as described below in greater detail.

The dry ingredients are mixed together with a "wet" (aqueous) portion of the core composition in the mixer apparatus. The wet portion can include a first component (referred to as a "paper pulp solution") that preferably includes a mixture of water, paper pulp, and, optionally, fluidity-increasing agents. A set retarder also can be included. A majority of the water present in the slurry is introduced via the pregenerated foam. Another source for water in the slurry is the paper pulp solution. Other sources for the introduction of water into the slurry include, but are not limited to, mixtures of the aforementioned strengthening agent and other conventional additives, when used.

A principal ingredient of the wallboard core composition of the invention is calcium sulfate hemihydrate, or stucco ($CaSO_4 \cdot \frac{1}{2}H_2O$). Calcium sulfate hemihydrate generally is described by Petersen, D. J., et al. "Calcium Compounds (Calcium Sulfate)," *Encyclopedia of Chemical Technology*, (1992 4th ed.), vol. 4, pp. 812–26, TP9.E685, the disclosure of which is hereby incorporated herein by reference, and can be produced by the methods described above. As is known by those of skill in the art, there are two types or forms of calcium sulfate hemihydrate, an α-hemihydrate form and a β-hemihydrate form. These two forms typically are produced by different types of calcination processes and differ structurally to some extent. Either type of calcium sulfate hemihydrate, however, is suitable for use in the present invention. Stucco preferably is present in the gypsum slurry composition extruded from the die exit in an amount of about 59 to about 64 wt. % based on the total weight of the gypsum slurry composition, more preferably about 60 to about 63 wt. %, for example about 61 to about 62 wt. %.

An optional antidesiccant, such as starch, also can be included to provide added strength to the finished wallboard product, however, it is not necessary to the success of the invention. Accordingly, the antidesiccant can be present in an amount of less than about 5 lbs/MSF. In some products, optional lightweight aggregates (e.g., treated expanded perlite or vermiculite) also can be included.

An aqueous slurry or solution of paper pulp also can be included in the core composition. The pulp solution comprises water and paper fibers ("paper pulp"), and may also include an optional binder, a set retarder (or setting agent), corn starch, and/or potash. Optional binders that can be used include, but are not limited to, inorganic binders such as, for example, colloidal silica and colloidal alumina. It may be desirable to utilize a suitable set retarder when an inorganic binder is present in order to provide moisture resistance and, thereby, avoid sacrificing strength due to the presence of moisture. The set retarder can be used to tailor the set time of the core composition. Set retarders typically are used in the invention at very low rates (if at all), for example at about 0.0007 weight percent, based on the weight of the core composition.

The terms "set retarder" and "setting agent" are used herein to include any substance which will react with the stucco to form an insoluble complex. One class of such setting agents which can be used in the present invention comprises divalent or trivalent metal compounds, such as magnesium oxide, zinc oxide, calcium carbonate, magnesium carbonate, zinc sulfate, and zinc stearate.

The paper pulp solution also can include one or more of a number of additives that increase the fluidity of the slurry and/or reduce the water requirements of slurry. Materials used as fluidity-enhancing and/or water-reducing agents include "lignosulfonates" which are commercially-available either in liquid or powder form. Fluidity-enhancing and/or water-reducing agents supplied in liquid form can be either incorporated in the pulp solution or added directly to the mixing operation.

The paper pulp solution can be prepared by blending or mixing the above ingredients with water in a blending apparatus. Alternatively, a concentrated pulp solution using only a small volume of water can be produced. In this case, the remainder of the core mix water requirement is made up with water from a separate water source, such as pregenerated foam, for example. In contrast to conventional gypsum slurries, a large excess of water with respect to the above-described rehydration reaction preferably is not included. Typically, about 15 to about 20 weight parts pulp water are used per 100 weight parts stucco. In contrast, conventional gypsum wallboard manufacturing processes utilize a large excess of more than about 40 weight parts pulp water per 100 weight parts stucco.

Preferably, high shear mixing "pulps" the material, forming a homogenous solution or slurry. The pulp solution can be transferred to a holding vessel, from which it can be continuously added to the core composition mix. The paper fibers in the pulp solution can serve to enhance the flexibility of the gypsum wallboard. Gypsum wallboard made without fibers can be very brittle and more susceptible to fracture during handling. The paper fibers also aid in evenness of drying during manufacture, as well as enhance the ability of the final wallboard product to accept and hold nails during installation.

As indicated above, the wet portion of the core composition also can include a component that incorporates a pregenerated foam (e.g., air encased in soap bubbles). Foam introduces air voids into the core through the use of a foam that contains very little solid material, but is resilient enough to resist substantial breakdown in the mixing operation. In this manner, the density of the core can be controlled. Known foaming agents may be supplied in either liquid or flake (powdered) form, and may be produced from soaps known in the art. Methods for preparing a pregenerated foam are generally known by those of skill in the art. It is believed that foam can be generated in situ within a modified version of mixers disclosed in U.S. Pat. Nos. 5,304,355 and 5,607,233, described above, if desired, by appropriate addition of soaps and surfactants.

One or more slip agents are preferably included to reduce drag as the slurry is discharged into the die and extruded therefrom. The slip agent is added to the core mixture in an amount of about 0.4 wt. % to about 1.5 wt. %, based on the weight of stucco present in the core mixture. Preferably, the slip agent is added to the core mixture in an amount of about 0.4 wt. % to about 1.0 wt. %, based on the weight of stucco present in the core mixture. Even more preferably, the slip agent is added to the core mixture in an amount of about 0.7 wt. % to about 0.8 wt. %, based on the weight of stucco present in the core mixture. The slip agent can also be introduced into the slurry as it passes through the die via injection ports or conduits of the die. A suitable slip agent for use in the present invention is ZELEC NE, which is commercially-available from Stepan Chemical Co. of Fieldsboro, N.J. (ZELEC is a registered trademark of Stepan Co.).

A strength-enhancing agent is preferably added to the gypsum slurry as it passes through the die exit. Preferably, the strength-enhancing agent is added to that slurry portion which will eventually form the edge portions of the wallboard. The strength-enhancing agent of the invention preferably includes, and may consist essentially of, an acrylic polymer emulsion having certain preferred properties, as described below. When added to the gypsum wallboard core composition, the acrylic polymer emulsion can provide significantly increased core strength, paper-to-core bond, and other physical properties. Consequently, the board density can be reduced while still maintaining other desirable board physical properties. Furthermore, when added in concentrated amounts to edge portions of the board core, the agent can serve to enhance greatly the strength of said edge portions. Strong edge portions are particularly desirable as it is at these edge portions where the wallboards are secured to studs by nails or screws, for example. Although the invention is not limited by any particular mechanism and the mechanisms that achieve the benefits of the invention are not presently clearly understood, it is believed that the acrylic polymer deposits itself in the contact areas between crystals of calcium sulfate dihydrate.

Suitable additives and methods of using the same are described in U.S. Pat. No. 5,879,825, assigned to the assignee of the present application, the disclosure of which is hereby incorporated herein by reference. One important factor in selecting the acrylic polymer emulsion is the glass transition temperature, or "$T_g$", of the acrylic polymer emulsion. The glass transition temperature is the temperature at which an amorphous material changes from a brittle vitreous state to a plastic state. Many polymers such as acrylics and their derivatives have this transition point, which may, at least in some cases, be related to the number of carbon atoms in their ester groups.

The polymer emulsion should have a glass transition temperature ($T_g$) of about 15° C. or greater, and preferably in the range of about 15° C. to about 60° C., more preferably in the range of about 20° C. to about 60° C., and most preferably in the range of about 35° C. to about 60° C.

It has been found that polymer emulsions having $T_g$ values substantially below about 15° C. undesirably provide a core that forms a moisture vapor transmission barrier at the plane of evaporation. The plane of evaporation is the location at or below the core surface where the water drawn thereto evaporates during the drying process. A moisture transmission barrier is formed if the polymer forms a film that inhibits the water within the gypsum wallboard from evaporating in a reasonable period of time. Such a film would make it substantially more difficult to dry gypsum wallboard cores, causing increased energy and cost requirements for the drying process. Therefore, it is not desirable to form a film in the wallboard core. The invention therefore allows use of commercial manufacturing apparatus and facilities.

Certain acrylic polymer emulsions are more stable than others in the aqueous calcium sulfate environment encountered during the gypsum wallboard production process. Since the divalent calcium ions in the aqueous slurry can adversely affect the performance of some polymer emulsions, the polymer emulsion should be formulated to be stable to calcium ions.

By way of example only, the acrylic polymer may have a molecular weight in the range of about 300,000 to about 700,000, although this range is believed to be variable. Acrylic polymers having other molecular weights are useful with the invention. The acrylic polymer can be crosslinked or noncrosslinked.

The polymers used with the invention are preferably neutralized with sodium hydroxide (NaOH) or other nonvolatile neutralizing agent, and more preferably neutralized with an agent consisting essentially of a nonvolatile neutralizing agent. Ammonium hydroxide is preferably not included in any substantial amount in the neutralizing agent for the acrylic polymer, since substantial amounts may adversely affect the product. Most preferably, the neutralizing agent is substantially free of ammonium salts or other source of ammonia.

Various acrylic polymer emulsions suitable for use with the invention are commercially available. For example, suitable polymer emulsions are available from Rohm & Haas Company of Philadelphia, Pa. under the trade name Rhoplex (e.g., Rhoplex 55-521, Rhoplex E-2409, and Rhoplex B-1162). Other polymer emulsions in the Rhoplex line have been designated by Rohm & Haas as RG 2718, RG 2719, RG 2721, and KAK 1868. Other suitable polymer emulsions are available from The Dow Chemical Company of Midland, Mich.

The polymer emulsions can include about 20 to about 80 weight percent of an acrylic polymer, about 20 to about 80 weight percent water, about 0.3 weight percent or less aqua ammonia, and less than about 0.1 weight percent residual monomers. The emulsions can have a pH in a range of about 2.1 to about 11.0, and a specific gravity in a range of about 1.0 to about 1.2.

The strength-enhancing agent of the invention is preferably included at a rate in a range of about 0.25 to about 2.5 percent solids, more preferably about 0.5 to about 2.0 percent solids, and most preferably about 0.5 to about 1.0 percent solids, based on the weight of the rehydrated gypsum in the final product.

One advantage of the invention is that the slurry may be prepared in the mixer without incorporation of a set accelerator into the slurry until the mixing process is substantially complete. The set accelerator is introduced into the gypsum slurry composition substantially near the discharge end of the mixer (e.g., after all other slurry ingredients have been added to the mixer). The set accelerator is used to control, within certain limits, the crystal growth rate and set time of the stucco. Examples of suitable accelerators include ball mill accelerators ("BMA") and potassium sulfate, although many others are known by the skilled artisan. In some cases, the invention may require increased amounts of accelerator due to the retarding effect of some of the strength-enhancing additives.

Addition of the set accelerator downstream of the mixing apparatus obviates the likelihood that the gypsum setting reaction will occur prematurely within an upstream portion of the mixing apparatus. Furthermore, the likelihood that process equipment upstream of the extrusion die will foul and/or plug with the slurry also is diminished greatly by addition of the set accelerator towards the discharge end of the mixer.

Another advantage of the invention is that the gypsum slurry prepared within the mixing apparatus can be supplemented by the addition of further gypsum slurry additives via the die periphery. These agents include, but are not limited to, the aforementioned slip agents and the strength-enhancing acrylic polymer.

Additional advantages of the invention include, but are not limited to, the elimination of conventional slurry-discharge means, such as discharge boots, hard-edge mixers, forming plates, powered rolling or smoothing (doctor) bars, and edge tape. Furthermore, because the slurry may be soft-extruded directly onto the conveyor belt, there is typically no need for sheets of cover paper to encase the slurry, which are required when using a conventional, less viscous (cake batter-like) gypsum slurries. According to the invention, use of these sheets of cover paper can be deferred to a point in the wallboard manufacturing process where the wallboard has already been dried.

The produced core composition (i.e., aqueous gypsum slurry) is deposited directly onto a smooth, continuously moving conveyor belt. The core composition is allowed to cure or set, whereby calcium sulfate hemihydrate is converted to calcium sulfate dihydrate. In one embodiment, as the core slurry is deposted on the moving, smooth-surface conveyor belt, the top surface of the exposed core slurry can be sprayed with a chemical activator (or accelerator). The chemical activator accelerates the setting reaction in a manner similar to that used with plaster to "brown" plaster. The chemical activator preferably acts fast enough to accelerate setting of the mass of deposited slurry and should provide an induction time before the slurry begins to from crystals, yet allow rapid crystallization to occur after the induction time.

Thereafter, the product preferably is dried to remove water not consumed in the setting reaction (i.e., the reaction forming the calcium sulfate dihydrate). When the board is removed from the smooth-surface conveyor belt, the board preferably has a dense, glassy surface that, when dry, provides an excellent surface for lamination of desired surface materials as described in more detail below.

In contrast to conventional methods, the present invention preferably does not require, and preferably does not utilize, high levels of process water to decrease the viscosity of the slurry during production. Because the present invention utilizes a soft-extrusion step, the necessity of high levels of water is obviated, as fluidity and viscosity are not as significant of a problem as in conventional processes. Furthermore, the present invention obviates the use of sheets of cover paper to encase the gypsum slurry and defers application of these sheets, if at all, until after the slurry has been dried to form a hardened wallboard core.

Conventional wallboard forming processes typically require removal of about 800 lbs/MSF (about 3900 kilograms per one thousand square meter (kg/M SM)) to about 850 lbs/MSF (4150 kg/MSM) water from a slurry encased by sheets of cover paper. This water has to be evaporated through the paper cover sheets in energy-intensive, expensive drying steps which require about 36 to about 40 minutes to remove the water.

In contrast, in a preferred embodiment of the invention, less than about 700 pounds of water per MSF (about 3417 kg/MSM) must be removed. More preferably, less than about 600 lbs/MSF (about 2925 kg/MSM), and even more preferably less than about 400 lbs/MSF (about 1950 kg/MSM) must be removed. Thus, the invention provides a reduction in the use of process water by about 12.5% to about 53%, preferably about 12.5% to about 25%, when compared to conventional gypsum wallboard manufacturing processes.

With less water to be evaporated, energy-intensive, expensive dryers preferably are no longer necessary. Instead, it has been discovered that with only about 600 lbs/MSF water to be evaporated, a hybrid dryer employing microwave heating techniques in combination with convection drying can be used. This advanced hybrid dryer provides a substantial cost and energy savings over the conventional dryers used to evaporate large amounts of water.

The hybrid dryer includes microwave heating and concurrent convection drying capabilities. The microwave heating serves to heat the water present in the wallboard core to a temperature of about the vaporization temperature of the water, and it preferably causes the heated water to migrate from the core to outer surfaces of the wallboard core. As the water migrates to the outer surfaces, the water can be more easily removed by convection drying in the hybrid dryer, and when the wallboard core passes through the downstream convection dryer. These hybrid dryers are typical in cereal manufacturing processes where they are used to dry wet cereals. Hybrid dryers cannot generally be used in conventional gypsum wallboard manufacturing processes because the microwave heating would likely cause the paper cover sheets encasing the wet gypsum core to blow off of the core. In the present invention, however, preferably no such paper cover sheets are used to encase the viscous gypsum slurry and, therefore, use of a hybrid dryer is possible.

A downstream convection dryer also can be used in-line to dry the uncut gypsum wallboard core. The convection dryer preferably includes a number of drying zones each of which can provide heat at different temperatures depending upon the amount of moisture present in the wallboard core. Infrared moisture sensors can be positioned within the various zones of the convection dryer to control the temperatures encountered in each zone. Preferably, the board drying is computer controlled. Conventional gypsum wallboard manufacturing processes utilized convection drying kilns which were responsible for simultaneously drying a number of pre-cut and vertically-stacked gypsum wallboards. Because the wallboard core prepared according to the present invention is dried in the absence of conventional paper covering and prior to cutting, better drying control can be achieved.

According to the present invention, utilizing the aforementioned hybrid dryer and convection dryer, the time required to remove about 600 lbs/MSF water can be accomplished in less than about 15 minutes, preferably less than about 12 minutes, more preferably in about 10 to about 12 minutes, and even more preferably about 6 to about 7 minutes. The lack of paper cover sheets and the use of a hybrid dryer enable one to achieve such short drying times.

Gypsum wallboard can be adapted for wet and exterior applications, in addition to use in constructing interior walls and ceilings. In the production of exterior sheathing and moisture-resistant board cores, various materials can be incorporated into the core to impart, for example, fire resistance and/or increased water absorption resistance to the board. Useful materials include silicone water repellents, mica, paraffin granules, fly ash spheres, perlite, vermiculite, waxes, and asphalt emulsions. These materials are typically supplied as water emulsions to facilitate ease of incorporation into the board core. These materials can be added directly into the mixing apparatus or incorporated into the pulp solution prior to addition to the mixing apparatus. Furthermore, some core treatments, such as, for example, silicone water treatments, may be applied to the wallboard core downstream of the hybrid dryer and convection dryer. To the extent that these core treatments introduce water into the wallboard core, a convection dryer downstream of the treatment station can be used to drive off the undesired water.

The soft-extruded and dry gypsum core comprises calcium sulfate dihydrate in an amount in the range of at least about 90 percent by weight (wt. %), based on the total weight of the core. Preferably, the dry core comprises at least about 95 wt. % calcium sulfate dihydrate, and more preferably at least about 99 wt. %, based on the total weight of the core. Accordingly, the dry density of the core, which can be determined by standard techniques known by those of skill in the art, is about 50 pounds per cubic foot (pcf) or less, preferably about 45 pcf or less, and more preferably about 40 pcf (i.e., 1575 lbs/MSF) or less.

High-speed lamination equipment can be used to attach desired surface materials to the hardened, dry core. This can be accomplished in-line simultaneously to both surfaces of the board. Suitable surface materials can include a variety of films and decorative papers depending on the end use. Furthermore, prior to lamination, the core can be impregnated with strenth-enhancing agents, water-repelling agents, and/or other treatments. As previously noted, to the extent that these agents and/or treatments introduce water into the core, a downstream convection dryer can be used to remove the water prior to lamination and cutting/trimming.

Modem trimming equipment which typically could not be used in prior board forming processes due to the presence of cover sheets and the associated problems of (cover sheet) end peel, are suitable for use in the present invention. Furthermore, modem trimming equipment is preferred to cut and trim the boards made by the method of the present invention because the boards do not have burnt (i.e., overcalcined) edges which can damage the equipment.

Use of conventional cover sheets to enclose the gypsum slurry core is obviated by the present invention. These cover sheets, however, can be applied with a suitable adhesive (e.g., polyvinylacetate binder) to a dried wallboard core. When the board is to be covered by a vinyl or metallic finish, no paper cover sheets are necessary and the vinyl or metallic finish can be applied directly onto the surface of the dried wallboard core. Thus, the present invention reduces material costs by not requiring the use of cover sheets in certain instances. In addition to the cost savings, there are other process advantages that can be realized by reducing or eliminating the need for paper cover sheets. For example, conventional continuous processes often encountered periods where the process had to be shut down temporarily to attend to torn or improperly deployed cover sheets, cockles, cobbs, poor porosity, and mismatched papers for drying. Because these cover sheets are no longer necessary in certain applications, such temporary shut down periods are not likely to occur. Even when the paper cover sheets are desired, their application to a wallboard core is deferred until after the core has been dried, thereby avoiding the complexities associated with applying a paper cover sheet to a wet cake-batter like slurry.

Additional advantages of the invention include, but are not limited to, the elimination of conventional slurry-discharge means, such as discharge boots, hard-edge mixers, forming plates, powered rolling or smoothing bars, and edge tape. Without the need for such conventional slurry-discharge means, the present invention provides a reduction in capital costs associated with the manufacture of gypsum wallboard.

EXAMPLES

The following examples are provided to illustrate the invention but are not intended to limit the scope of the invention.

Examples 1–3 describe viscous gypsum slurries that can be prepared in a suitable mixer and provided to a die under positive displacement for extrusion onto a moving smooth-surface conveyor belt in accordance with the present invention. Additionally, Examples 1–3 are illustrative of various wallboard cores and core weights that can be achieved, and the low amount of water present in the gypsum slurries. In contrast, Comparative Example 4 describes a low-viscosity gypsum slurry prepared according to conventional gypsum wallboard manufacturing processes. Example 5 illustrates acceptable viscosities for gypsum slurries.

Example 1

This example is directed to a viscous gypsum slurry composition that can be prepared in a suitable mixer and to the water content therein. This example illustrates an embodiment of the invention using a high level of stucco (i.e., 63.08 wt. % stucco, based on the weight of the gypsum slurry).

Gypsum rock having a purity of 89.0 is used to prepare a wallboard having a core weight of about 1653 lbs/MSF of 0.472 inch thick board. The (gram) molecular weight of the land plaster corresponding to a gypsum rock purity of 89.0 is 193.45. Table I, below provides the composition of a gypsum rock (i.e., the (gram) molecular weights for each of the dihydrate, hemihydrate, anhydrite forms of calcium sulfate, and also for any inerts present in the mix).

TABLE I

| Constituent | Mol. Wt. (g/gmole) | Amount (parts/100 parts Land Plaster) | Amount (parts/100 parts Stucco) |
|---|---|---|---|
| Land Plaster | 193.45 | 100.00 | 116.74 |
| Dihydrate | 172.17 | 89.00 | 103.90 |
| Inerts | 21.28 | 11.00 | 12.84 |
| Hemihydrate | 145.15 | 68.99 | 80.54 |
| Anhydrite | 136.14 | 5.66 | 6.61 |
| Stucco | | 85.66 | 100.00 |

Based on the foregoing gypsum rock purity and target wallboard core weight, a gypsum slurry is prepared containing the ingredients listed in Table II, below:

TABLE II

| Board/Slurry Composition | Amount (lbs/1000 lbs of Stucco)† | Wt. % | Dry Weight (lbs/1000 lbs of Stucco)‡ |
|---|---|---|---|
| Dry Ingredients | | | |
| Stucco | 1000.0 | 63.08 | 1167.4 |
| Starch | 0.0 | 0.00 | 0.0 |
| Accelerator | 0.9 | 0.06 | 0.9 |
| Wet Ingredients | | | |
| Pulp Ingredients | | | |
| Paper | 2.3 | 0.15 | 2.3 |
| Pulp Water | 157.7 | 9.95 | 0.0 |
| Water Reducing Agent | 4.6 | 0.29 | 1.8 |
| Potash | 0.6 | 0.04 | 0.6 |
| Foam Ingredients | | | |
| Surfactant | 0.5 | 0.03 | 0.5 |
| Foam Water | 418.6 | 26.41 | 0.0 |
| Totals | 1585.3 | 100.00 | 1173.6 |

† = Weight is based upon 1000 lbs. of stucco.
‡ = Weight after conversion to gypsum, based upon 1000 lbs. of stucco.

The above formulation is calcined to convert all of the dihydrate to hemihydrate with slight overburn and minimal underburn. Accordingly, a rehydrated combined moisture level of the slurry is reduced from 18.63% to a stucco combined moisture level of about 4.91 %, which corresponds to a water loss of about 579 lbs/MSF of 0.472 inch thick board. This water was removed in accordance with the invention in a convection dryer in less than about 12 minutes. This water can be removed in accordance with the invention in a hybrid dryer (containing microwave heating and convection drying means) followed by a multi-zone convection dryer is less than about 10 minutes.

Example 2

This example is directed to a viscous gypsum slurry composition that can be prepared in a suitable mixer and to the water content therein. This example illustrates another embodiment of the invention using a particularly preferred amount of stucco (i.e., 61.62 wt. % stucco, based on the weight of the gypsum slurry).

Gypsum rock having a purity of 89.0 is used to prepare a wallboard having a core weight of about 1575 lbs/MSF of 0.472 inch thick board. The (gram) molecular weight of the land plaster corresponding to a gypsum rock purity of 89.0 is 193.45. Table I in Example 1, above, the composition of the gypsum rock.

Based on the foregoing gypsum rock purity and target wallboard core weight, a gypsum slurry is prepared containing the ingredients listed in Table III, below:

TABLE III

| Board/Slurry Composition | Amount (lbs/1000 lbs of Stucco)† | Wt. % | Dry Weight (lbs/1000 lbs of Stucco)‡ |
|---|---|---|---|
| Dry Ingredients | | | |
| Stucco | 1000.0 | 61.62 | 1167.4 |
| Starch | 0.0 | 0.00 | 0.0 |
| Accelerator | 0.9 | 0.06 | 0.9 |
| Wet Ingredients | | | |
| Pulp Ingredients | | | |
| Paper | 2.3 | 0.14 | 2.3 |
| Pulp Water | 177.0 | 10.91 | 0.0 |
| Water Reducing Agent | 4.6 | 0.28 | 1.8 |
| Potash | 0.6 | 0.04 | 0.6 |
| Foam Ingredients | | | |
| Surfactant | 0.5 | 0.03 | 0.5 |
| Foam Water | 436.8 | 26.92 | 0.0 |
| Totals | 1622.7 | 100.00 | 1173.6 |

† = Weight is based upon 1000 lbs. of stucco.
‡ = Weight after conversion to gypsum, based upon 1000 lbs. of stucco.

The above formulation is calcined to convert all of the dihydrate to hemihydrate with slight overburn and minimal underburn. Accordingly, a rehydrated combined moisture level of the slurry is reduced from 18.63% to a stucco combined moisture level of about 4.91 %, which corresponds to a water loss of about 601 lbs/MSF of 0.472 inch thick board. This water was removed in accordance with the invention in a convection dryer in less than about 12 minutes. This water can be removed in accordance with the invention in a hybrid dryer (containing microwave heating and convection drying means) followed by a multi-zone convection dryer is less than about 10 minutes.

Example 3

This example is directed to a viscous gypsum slurry composition that was prepared, and to the water content therein. This example illustrates yet another embodiment of the invention using a low amount of stucco (i.e., 59.39 wt. % stucco, based on the weight of the gypsum slurry).

Gypsum rock having a purity of 90.0 was used to prepare a wallboard having a core weight of about 1459 lbs/MSF of 0.472 inch thick board. The (gram) molecular weight of the land plaster corresponding to a gypsum rock purity of 90.0 is 191.3. Table IV, below provides the composition of the gypsum rock (i.e., the (gram) molecular weights for each of the dihydrate, hemihydrate, anhydrite forms of calcium sulfate, and also for any inerts present in the mix).

TABLE IV

| Constituent | Mol. Wt. (g/gmole) | Amount (parts/100 parts Land Plaster) | Amount (parts/100 parts Stucco) |
|---|---|---|---|
| Land Plaster | 191.30 | 100.00 | 117.27 |
| Dihydrate | 172.17 | 90.00 | 105.54 |
| Inerts | 19.13 | 10.00 | 11.73 |
| Hemihydrate | 145.15 | 66.17 | 77.60 |
| Anhydrite | 136.14 | 9.1 | 10.67 |
| Stucco | | 85.27 | 100.00 |

Based on the foregoing gypsum rock purity and target wallboard core weight, a gypsum slurry was prepared containing the ingredients, listed in Table V, below:

TABLE V

| Board/Slurry Composition | Amount (lbs/1000 lbs of Stucco)† | Wt. % | Dry Weight (lbs/1000 lbs of Stucco)‡ |
|---|---|---|---|
| Dry Ingredients | | | |
| Stucco | 1000.0 | 59.39 | 1172.7 |
| Starch | 0.0 | 0.00 | 0.0 |
| Accelerator | 0.9 | 0.06 | 0.9 |
| Wet Ingredients | | | |
| Pulp Ingredients | | | |
| Paper | 2.3 | 0.14 | 2.3 |
| Pulp Water | 239.1 | 14.20 | 0.0 |
| Water Reducing Agent | 4.6 | 0.27 | 1.8 |
| Potash | 0.6 | 0.03 | 0.6 |
| Foam Ingredients | | | |
| Surfactant | 0.5 | 0.03 | 0.5 |
| Foam Water | 435.6 | 25.87 | 0.0 |
| Totals | 1683.6 | 100.00 | 1178.9 |

† = Weight is based upon 1000 lbs. of stucco.
‡ = Weight after conversion to gypsum, based upon 1000 lbs. of stucco.

The above formulation is calcined to convert all of the dihydrate to hemihydrate with slight overburn and minimal underburn. Accordingly, a rehydrated combined moisture level of the slurry was reduced from 18.83% to a stucco combined moisture level of about 4.68%, which corresponded to a water loss of about 623 lbs/MSF of 0.472 inch thick board. This water was removed in accordance with the invention in a convection dryer in less than about 12 minutes. This water can be removed in accordance with the invention in a hybrid dryer (containing microwave heating and convection drying means) followed by a multi-zone convection dryer is less than about 10 minutes.

Comparative Example 4

This example is directed to a viscous gypsum slurry composition that was prepared in a pin mixer according to conventional gypsum wallboard manufacturing practices, and to the water content therein. Gypsum rock having a purity of 89.0 was used to prepare a wallboard having a core weight of about 1664 lbs/MSF of 0.470 inch thick board. Each of two sheets of cover paper which encase the wet gypsum slurry prior to setting have a thickness of about 0.0135 inch. Accordingly, a finished wallboard of this example had a thickness of about 0.500 inch. Based on the foregoing gypsum rock purity and target wallboard core weight, a gypsum slurry was prepared containing the ingredients listed in Table VI, below. The gypsum composition had a viscosity too low for use in a positive displacement mixer of the type described herein and is not suitable for extrusion via a die.

TABLE VI

| Board/Slurry Composition | Amount (lbs/1000 lbs of Stucco)† | Wt. % | Dry Weight (lbs/1000 lbs of Stucco)‡ |
|---|---|---|---|
| Dry Ingredients | | | |
| Stucco | 1000.0 | 55.20 | 1167.4 |
| Starch | 4.9 | 0.27 | 4.9 |
| Accelerator | 1.7 | 0.09 | 1.7 |
| Wet Ingredients | | | |
| Pulp Ingredients | | | |
| Paper | 2.3 | 0.13 | 2.3 |
| Pulp Water | 424.9 | 23.46 | 0.0 |
| Water Reducing Agent | 3.4 | 0.19 | 1.4 |
| Potash | 0.6 | 0.03 | 0.6 |
| Foam Ingredients | | | |
| Surfactant | 0.6 | 0.03 | 0.6 |
| Foam Water | 373.1 | 20.60 | 0.0 |
| Totals | 1811.6 | 100.00 | 1178.9 |

† = Weight is based upon 1000 lbs. of stucco.
‡ = Weight after conversion to gypsum, based upon 1000 lbs. of stucco.

The above formulation is calcined to convert all of the dihydrate to hemihydrate with slight overburn and minimal underburn. Accordingly, a rehydrated combined moisture level of the slurry was reduced from 18.63% to a stucco combined moisture level of about 4.91%, which corresponded to a water loss of about 849 lbs/MSF of 0.500 inch thick wallboard, in this case. In order to remove this amount of water utilizing a conventional gypsum wallboard manufacturing process (i.e., a conventional convection drying kiln), the drying time was about 36 to about 40 minutes.

The following Table VII summarizes the composition of the various slurries prepared in each of Examples 1–4, and comparative Example 5, including the board core weight and water content.

TABLE VII

| Board/Slurry Composition | Ex. 1 | Ex. 2 | Ex. 3 | Ex. 4 Comp. |
|---|---|---|---|---|
| Dry Ingredients | | | | |
| Stucco | 63.08 | 61.62 | 59.39 | 55.20 |
| Starch | 0.00 | 0.00 | 0.00 | 0.27 |
| Accelerator | 0.06 | 0.06 | 0.05 | 0.09 |
| Wet Ingredients | | | | |
| Pulp Ingredients | | | | |
| Paper | 0.15 | 0.14 | 0.14 | 0.13 |
| Pulp Water | 9.95 | 10.91 | 14.20 | 23.46 |
| Water Reducing Agent | 0.29 | 0.28 | 0.27 | 0.19 |
| Potash | 0.04 | 0.04 | 0.03 | 0.03 |
| Foam Ingredients | | | | |
| Surfactant | 0.03 | 0.03 | 0.03 | 0.03 |
| Foam Water | 26.41 | 26.92 | 25.87 | 20.60 |
| Totals | 100.00 | 100.00 | 100.00 | 100.00 |
| Finished Board Core Wt. (lbs/MSF) | 1653 | 1575 | 1459 | 1664* |
| Water Loss (lbs/MSF) | 579 | 601 | 623 | 849 |

* = Weight includes 100 lbs/MSF of paper cover sheets which are required in conventional wallboard forming operations.

Based on Examples 1–3 and Comparative Example 4, it is apparent that gypsum wallboard cores made in accordance with the present invention contain much less water (e.g., about 579 to about 623 lbs/MSF) compared to gypsum wallboards made in accordance with conventional processes (e.g., about 849 lbs/MSF). The reduced water content is an advantage that aids downstream drying operations and improves the overall efficiency of the wallboard manufacturing process.

Example 5

This example demonstrates the viscous nature of a gypsum slurry that can be prepared in accordance with the present invention utilizing a suitable mixture and low water content and compares the viscosity of the slurries to that of gypsum slurries ill-suited for use in the present invention.

Slump tests were performed to determine the viscosity of gypsum slurries capable of being prepared in a suitable mixer operating under conditions sufficient to provide the slurry to a die inlet under positive displacement.

The test was conducted after dipping a brass cylinder having a wall thickness of about 0.07 inches, a height of about 4 inches, and an inner diameter of about 2 inches into a low-viscosity lubricating oil bath. The cylinder was removed and excess oil was drained off the surfaces of the cylinder. The cylinder then was placed upright onto a center portion of a clean (i.e., no scratches), dry glass plate having the following dimensions: about 10 inches in length, about 10 inches in width, and about 0.1875 inch thick.

The mixed slurry was poured into the cylinder such that the cylinder was completely filled with a slight excess. The scoop can be a clean metal or plastic scoop of convenient size or can be formed from disposable gypsum board paper. The excess was screened off to a level with the top of the cylinder without dropping any of the slurry onto the surface of the glass plate.

Within about 10 seconds of removing excess slurry, the cylinder was raised vertically with a smooth and uniform motion, and the slurry contained within the cylinder was allowed to slump to a circular patty onto the surface of the glass plate. After the slurry had solidified, the glass plate was turned over and the diameter of the slump in contact with the glass plate was measured to the nearest ⅛ inch.

A Brookfield DV-III Programmable Rheometer with a No. 6 spindle was used to determine the viscosity of the various gypsum slurry slumps. The viscosity of the various slumps are reported in Table VIII, below, based on rotations per minute (RPM) of the spindle and the % torque:

TABLE VIII

Viscosity (mPa · s) of Various Slump Sizes (% Torque)

| RPM | 7¼ Slump | 6¾ Slump | 5⅝ Slump | 3¼ Slump |
|---|---|---|---|---|
| 10 | 23,800 (24.1%) | 22,800 (23.0%) | 26,200 (26.3%) | 29,300 (28.5%) |
| 20 | 12,250 (24.0%) | 12,550 (27.1%) | 14,000 (26.0%) | 19,000 (32.3%) |
| 40 | 6,425 (25.7%) | 6,3.75 (24.9%) | 7,125 (28.5%) | 8,800 (34.5%) |
| 60 | 4,583 (27.3%) | 4,833 (27.1%) | 5,000 (30.2%) | 6,200 (37.5%) |

Generally, gypsum slurry compositions suitable for use in the present invention include those having a viscosity of at least about 19,000 mPa·s, preferably about 19,000 to about 22,000 mPa·s, and more preferably about 20,000 mPa·s as measured above at 20 RPMs. Furthermore, gypsum slurry compositions suitable for use in the present invention include those having a viscosity of at least about 29,300 mPa·s as measured at 10 RPM, at least about 8,800 mPa·s as measured at 40 RPMs, and at least about 6,200 mPa·s as measured at 60 RPMs.

The foregoing description is given for clearness of understanding only, and no unnecessary limitations should be understood therefrom, as modifications within the scope of the invention may be apparent to those having ordinary skill in the art.

What is claimed is:

1. A method of forming a gypsum wallboard core, the method comprising the steps of:
   (a) preparing a gypsum slurry in a mixer;
   (b) introducing the slurry into an extrusion die, the die having provisions at its periphery for the introduction of at least one gypsum slurry additive wherein the gypsum slurry additive is a slip agent or a strength-enhancing agent, and wherein the slurry additive is an emulsion or fluid;
   (c) introducing the slurry additive into the slurry as the slurry exits the die; and,
   (d) extruding the additive-containing gypsum slurry from the die onto a substantially flat, moving surface to form a gypsum wallboard core.

2. The method of claim 1 further comprising the step of:
   (e) drying the slurry obtained from step (d) in a hybrid dryer by convection heating and microwave drying techniques to form a dry gypsum wallboard core.

3. The method of claim 2, wherein less than about 700 pounds per thousand square feet of one-half inch board of water are removed from the slurry during the drying step (e) to form a dry gypsum wallboard core.

4. The method of claim 3, wherein less than about 600 pounds per thousand square feet of one-half inch board of water are removed from the slurry during the drying step (e) to form a dry gypsum wallboard core.

5. The method of claim 4, wherein less than about 400 pounds per thousand square feet of one-half inch board of water are removed from the slurry during the drying step (e) to form a dry gypsum wallboard core.

6. The method of claim 3, wherein the drying step (e) is performed in a time of less than about 15 minutes.

7. The method of claim 6, wherein the drying step (e) is performed in a time of about 10 minutes to about 12 minutes.

8. The method of claim 7, wherein the drying step (e) is performed in a time of about 6 minutes to about 7 minutes.

9. The method of claim 2, wherein the dry gypsum wallboard core comprises at least about 90 wt. % calcium sulfate dihydrate, based on the total weight of the core.

10. The method of claim 9, wherein the dry gypsum wallboard core comprises at least about 95 wt. % calcium sulfate dihydrate, based on the total weight of the core.

11. The method of claim 10, wherein the dry gypsum wallboard core comprises at least about 99 wt. % calcium sulfate dihydrate, based on the total weight of the core.

12. The method of claim 2, wherein the dry gypsum wallboard core has a density of about 50 pounds per cubic foot or less.

13. The method of claim 12, wherein the dry gypsum wallboard core has a density of about 45 pounds per cubic foot or less.

14. The method of claim 13, wherein the dry gypsum wallboard core has a density of about 40 pounds per cubic foot or less.

15. The method of claim 1, wherein in step (d) the slurry is soft-extruded from the die under a pressure of about 5 psi to about 100 psi.

16. The method of claim 15, wherein the pressure is about 5 psi to about 30 psi.

17. The method of claim 16, wherein the pressure is about 10 psi to about 20 psi.

18. The method of claim 1, wherein the slurry extruded in step (d) has a viscosity of about 19,000 millipascal seconds (mPa·s) to about 22,000 mPa·s.

19. The method of claim 18, wherein the slurry extruded in step (d) has a viscosity of about 19,500 mPa·s to about 21,500 mPa·s.

20. The method of claim 19, wherein the slurry extruded in step (d) has a viscosity of about 19,500 mPa·s to about 21,000 mPa·s.

21. The method of claim 1, wherein the gypsum slurry has an open time of less than about 30 seconds.

22. The method of claim 21, wherein the open time is less than about 20 seconds.

23. The method of claim 22, wherein the open time is less than about 10 seconds.

24. The method of claim 1, wherein the slurry prepared in step (c) comprises about 59 wt. % to about 64 wt. % calcium sulfate dihydrate, based on the total weight of the slurry.

25. The method of claim 24, wherein the slurry prepared in step (c) comprises about 60 wt. % to about 63 wt. % calcium sulfate dihydrate, based on the total weight of the slurry.

26. The method of claim 25, wherein the slurry prepared in step (c) comprises about 61 wt. % to about 62 wt. % calcium sulfate dihydrate, based on the total weight of the slurry.

27. The method of claim 1, wherein the slurry prepared in step (a) comprises a material selected from the group consisting of: calcium sulfate hemihydrate, antidesiccants, gypsum set accelerators, water, foam, paper pulp, fluidity-increasing agents, binders, slip agents, set retarders, and pregenerated foam.

28. The method of claim 1, wherein the slurry prepared in step (a) comprises about 35 wt. % to about 40 wt. % water, based on the total weight of the slurry.

29. The method of claim 1, wherein the gypsum slurry prepared in step (d) has a rectangular cross-section and has a ratio of width to thickness of about 48:1 to about 216:1.

30. The method of claim 1, wherein the strength-enhancing agent comprises a polymer.

31. The method of claim 1, wherein the strength-enhancing agent comprises a polymer emulsion.

32. The method of claim 1, wherein the strength-enhancing agent comprises a polymer emulsion having a glass transition temperature of about 15° C. to about 60 ° C.

33. The method of claim 1, wherein:
the strength-enhancing agent comprises a polymer emulsion; and
the polymer has a molecular weight of about 300,000 to about 700,000.

34. The method of claim 1, wherein:
the strength-enhancing agent comprises a polymer emulsion; and
the polymer emulsion comprises about 20 weight percent to about 80 weight percent polymer.

35. The method of claim 1, wherein the strength-enhancing agent comprises a polymer emulsion that is included at rate of about 0.25 percent solids to about 2.5 percent solids.

36. The method of claim 1, wherein the strength-enhancing agent comprises an acrylic polymer emulsion.

37. The method of claim 1, wherein the slip agent is added to the slurry in an amount of about 0.4 wt. % to about 1.5 wt. %.

38. The method of claim 1, wherein:
the strength-enhancing agent comprises an acrylic polymer emulsion;
the polymer has a molecular weight of about 300,000 to about 700,000;
the acrylic polymer emulsion comprises about 20 weight percent to about 80 weight percent polymer;
the acrylic polymer emulsion is included at a rate of about 0.25 percent solids to about 2.5 percent solids; and
the slip agent is added to the slurry in an amount of about 0.4 wt. % to about 1.5 wt. %.

\* \* \* \* \*